US009019387B2

(12) United States Patent
Nakano

(10) Patent No.: US 9,019,387 B2
(45) Date of Patent: Apr. 28, 2015

(54) IMAGING DEVICE AND METHOD OF OBTAINING IMAGE

(75) Inventor: Akira Nakano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 292 days.

(21) Appl. No.: 13/413,946

(22) Filed: Mar. 7, 2012

(65) Prior Publication Data

US 2012/0236164 A1    Sep. 20, 2012

(30) Foreign Application Priority Data

Mar. 18, 2011    (JP) .................................. 2011-061631

(51) Int. Cl.
H04N 5/232    (2006.01)
G06T 5/50    (2006.01)

(52) U.S. Cl.
CPC ....... H04N 5/23277 (2013.01); H04N 5/23219 (2013.01); H04N 5/23254 (2013.01); G06T 5/50 (2013.01); G06T 2207/10024 (2013.01); G06T 2207/20008 (2013.01); G06T 2207/20221 (2013.01); G06T 2207/30201 (2013.01)

(58) Field of Classification Search
USPC .......................................... 348/208.6, 208.12
See application file for complete search history.

(56) References Cited

U.S. PATENT DOCUMENTS

| 7,773,819 | B2 | 8/2010 | Hiraga et al. | |
| 7,782,362 | B2 * | 8/2010 | Oshima ...................... | 348/208.6 |
| 7,903,155 | B2 | 3/2011 | Sakurai et al. | |
| 7,916,177 | B2 | 3/2011 | Motomura et al. | |
| 2007/0236578 | A1 * | 10/2007 | Nagaraj et al. ........... | 348/208.99 |
| 2008/0056613 | A1 * | 3/2008 | Hatanaka et al. ............. | 382/284 |
| 2009/0231446 | A1 * | 9/2009 | Lin ............................. | 348/208.4 |
| 2010/0208086 | A1 * | 8/2010 | Kothandaraman et al. .......................... | 348/208.4 |
| 2011/0007175 | A1 * | 1/2011 | Fujita et al. ................ | 348/222.1 |

FOREIGN PATENT DOCUMENTS

| JP | 2006-157568 | 6/2006 |
| JP | 2007-226643 | 9/2007 |
| JP | 2009-118434 | 5/2009 |
| JP | 4268220 | 5/2009 |
| JP | 2012-044510 | 3/2012 |

* cited by examiner

Primary Examiner — Jason Flohre
(74) Attorney, Agent, or Firm — IPUSA, PLLC

(57) ABSTRACT

An imaging device including an image sensor, includes an image obtaining control unit that obtains plural continuous images of an object taken by the image sensor; a size determining unit that determines an image size of reduced images based on photographing information of at least one of the images, and generates reduced images from the images obtained by the image obtaining control unit based on the determined image size; a motion vector detection unit that detects a motion vector of the reduced images; and an image synthesis unit that synthesizes the images obtained by the image obtaining control unit based on the motion vector detected by the motion vector detection unit to obtain a synthesized image.

19 Claims, 12 Drawing Sheets

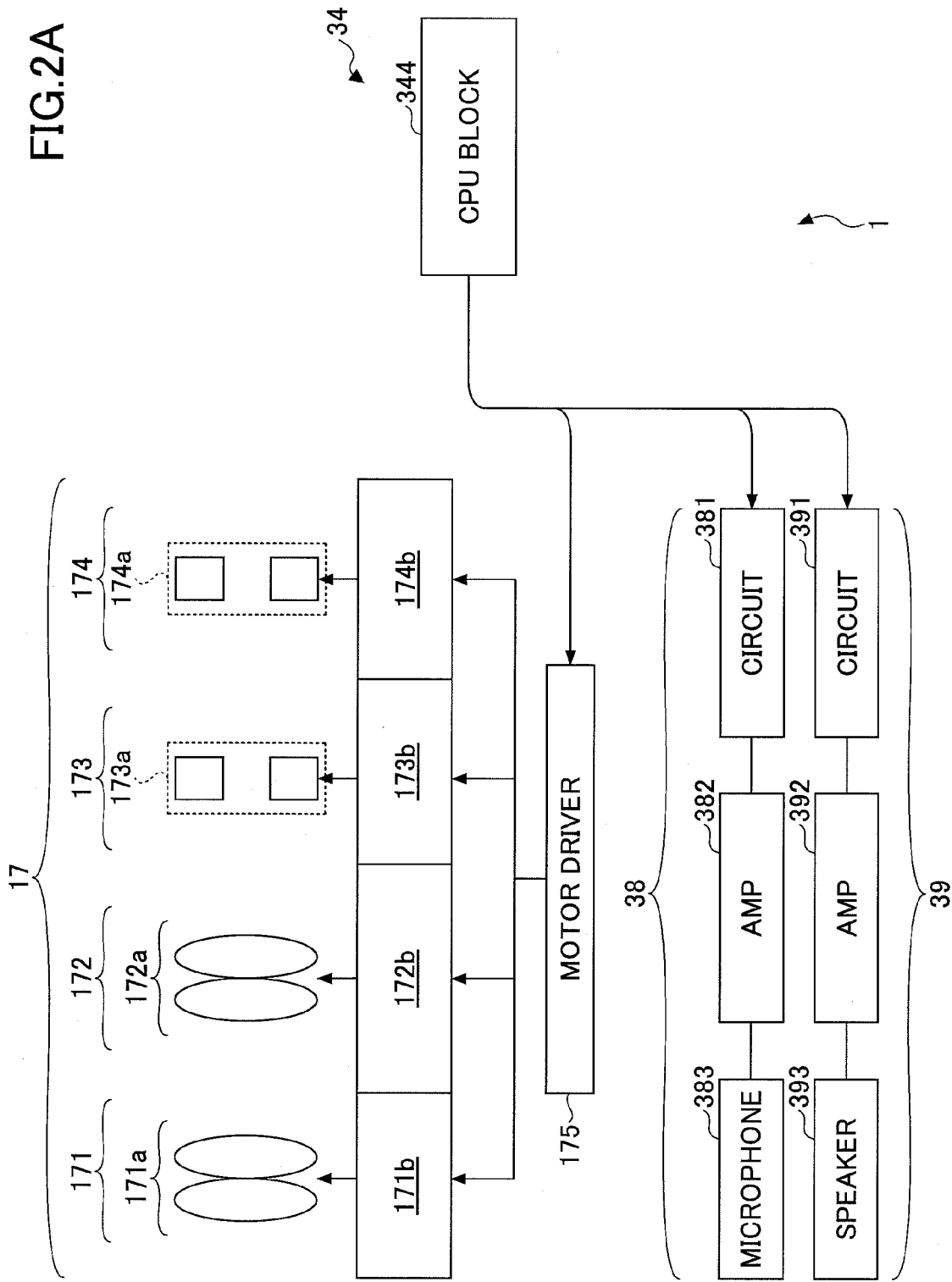

IMAGING DEVICE AND METHOD OF OBTAINING IMAGE

BACKGROUND OF THE INVENTION

1. Field of the Invention

The present invention relates to an imaging device and a method of obtaining an image and more specifically, to an imaging device and a method of obtaining an image, capable of obtaining an image appropriately corrected by electronic image stabilization.

2. Description of the Related Art

Conventionally, a technique of image stabilization for an imaging device such as a digital camera or the like, includes an optical image stabilization technique in which a position of an imaging surface or a lens with respect to the imaging surface is shifted to a direction opposite to the direction of hand movement or the like, or an electronic image stabilization technique in which a high-speed shutter is used to obtain plural time-division images, a specific point of an object in the images is used as a reference to synthesize the images to obtain a synthesized image. By using the electronic image stabilization technique, a mechanical structure is not necessary added since it is not necessary to change the position of the imaging surface or the lens to correct the hand movement, so that there is merit that a space and a cost of the imaging device can be reduced.

For the electronic image stabilization technique, it is disclosed in Patent Document 1, for example, that plural images are obtained, a motion vector is detected based on the obtained images by using one of the images as a reference, and a synthesized image is generated.

Further, for the electronic image stabilization technique, a corrected image is obtained by detecting a motion vector based on plural obtained images and synthesizing the images based on the detected motion vector. When detecting the motion vector, the obtained images are reduced to images having a predetermined size where the size of the reduced images is set at a predetermined value.

However, there may be a case where a motion vector with a higher accuracy is required, or a case where a faster speed is required although a precise motion vector is not as necessary, based on a condition in obtaining an image or an image.

It is not disclosed in Patent Document 1 about the image size of images for detecting a motion vector.

PATENT DOCUMENT

[Patent Document 1] Japanese Laid-open Patent Publication No. 2007-226643

SUMMARY OF THE INVENTION

The present invention is made in light of the above problems, and provides an imaging device and a method of obtaining an image, capable of obtaining an image appropriately corrected by electronic image stabilization.

According to an embodiment, there is provided an imaging device including an image sensor, further including an image obtaining control unit that obtains plural continuous images of an object taken by the image sensor; a size determining unit that determines an image size of reduced images based on photographing information of at least one of the images, and generates the reduced images from the images obtained by the image obtaining control unit based on the determined image size; a motion vector detection unit that detects a motion vector of the reduced images; and an image synthesis unit that synthesizes the images obtained by the image obtaining control unit based on the motion vector detected by the motion vector detection unit to obtain a synthesized image.

According to another embodiment, there is provided a method of obtaining an image by an image sensor, including, obtaining plural continuous images of an object taken by the image sensor; determining an image size of reduced images based on photographing information of at least one of the images; generating the reduced images from the obtained images based on the determined image size; detecting a motion vector of the reduced images; and synthesizing the obtained images based on the detected motion vector to obtain a synthesized image.

BRIEF DESCRIPTION OF THE DRAWINGS

Other objects, features and advantages of the present invention will become more apparent from the following detailed description when read in conjunction with the accompanying drawings.

FIG. 2A to 2C are block diagrams showing an example of a system structure of the imaging device;

DETAILED DESCRIPTION OF THE PREFERRED EMBODIMENTS

Figure 1A:
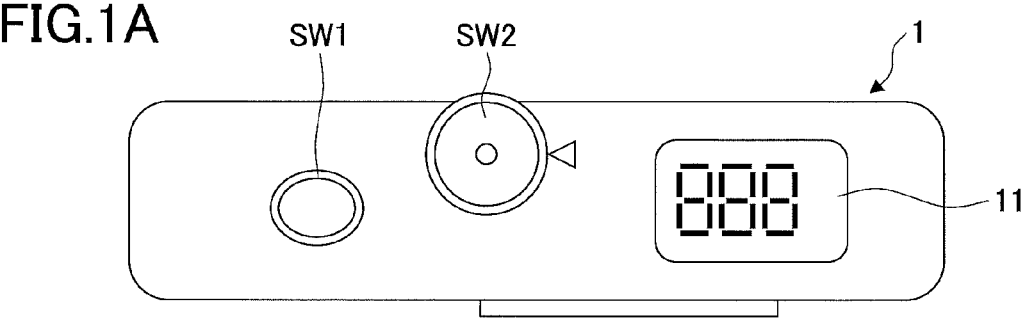
FIG. 1A is a top view.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

According to the embodiment, when correcting an image by electronic image stabilization, the image size of images used for detecting a motion vector is determined based on photographing information such as setting information of an imaging device in obtaining an image, or characteristic information of an obtained image. Here, the photographing information may be capable of defining a level of accuracy necessary for the motion vector (hereinafter simply referred to as "necessary accuracy". Therefore, the size of the images used for detecting a motion vector is determined in accordance with the necessary accuracy of the photographing information such that the higher the necessary accuracy, the larger the image size becomes. With this structure, the motion vector is appropriately detected in regard to accuracy and speed.

In other words, according to the embodiment, by selecting a higher accuracy for detecting a motion vector or a faster speed for detecting a motion vector, the motion vector is appropriately detected to obtain appropriate image stabilization.

(Imaging Device: Appearance)

Figure 1B:
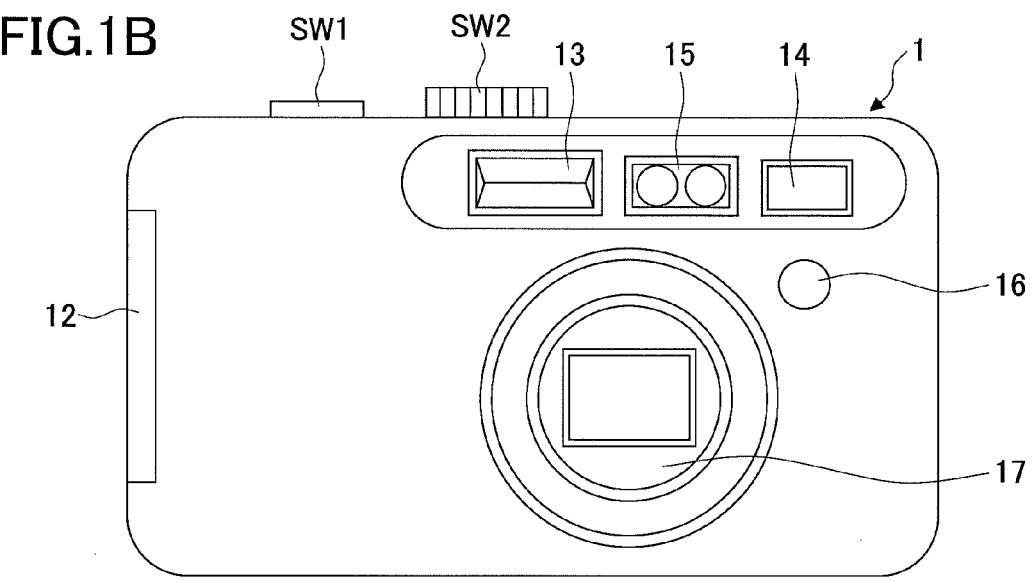
FIG. 1B is an elevation view.
Figure 1C:
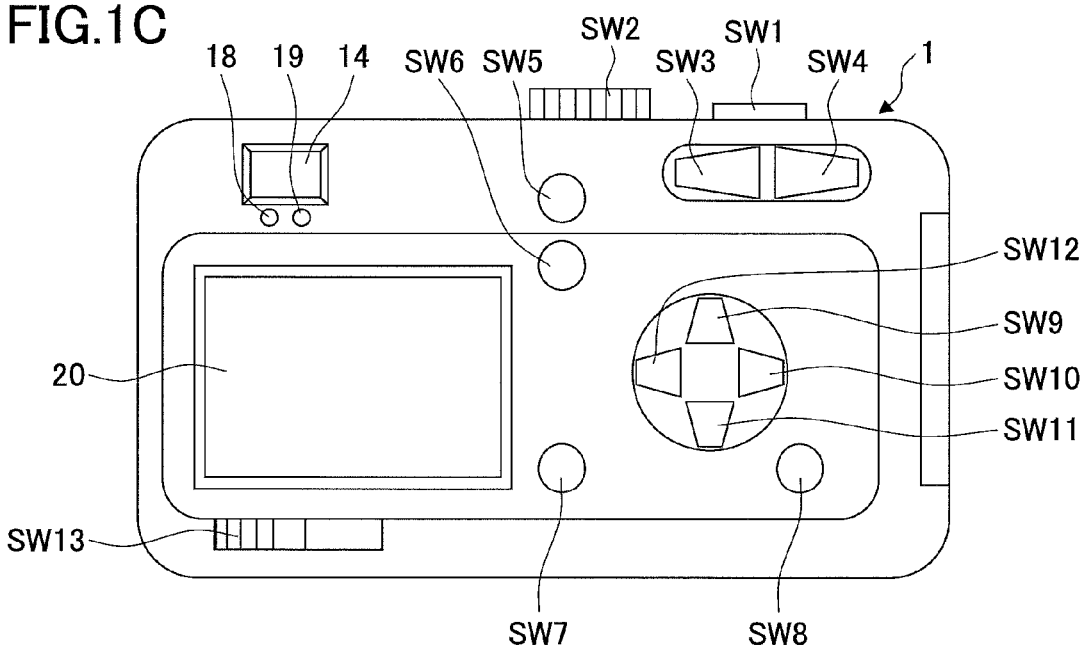
FIG. 1C is a back elevation view, of an example of an imaging device.

FIG. 1A is a top view, FIG. 1B is an elevation view, and FIG. 1C is a back elevation view, of an example of an imaging device 1. Although the imaging device 1 of this embodiment is shown as a digital camera, the structure and operation of the imaging device is not limited to that of the digital camera.

The imaging device 1 includes a sub liquid crystal display (LCD) 11, a memory card-battery unit 12, a flash lamp 13, an optical viewfinder 14, a ranging unit 15, a remote control light receiver 16, a lens-barrel unit 17, an LED for automatic focusing (AF) 18, an LED for flash 19, an LCD monitor 20, and switches SW1 to SW13.

(Imaging Device: System Structure)

Figure 2B:
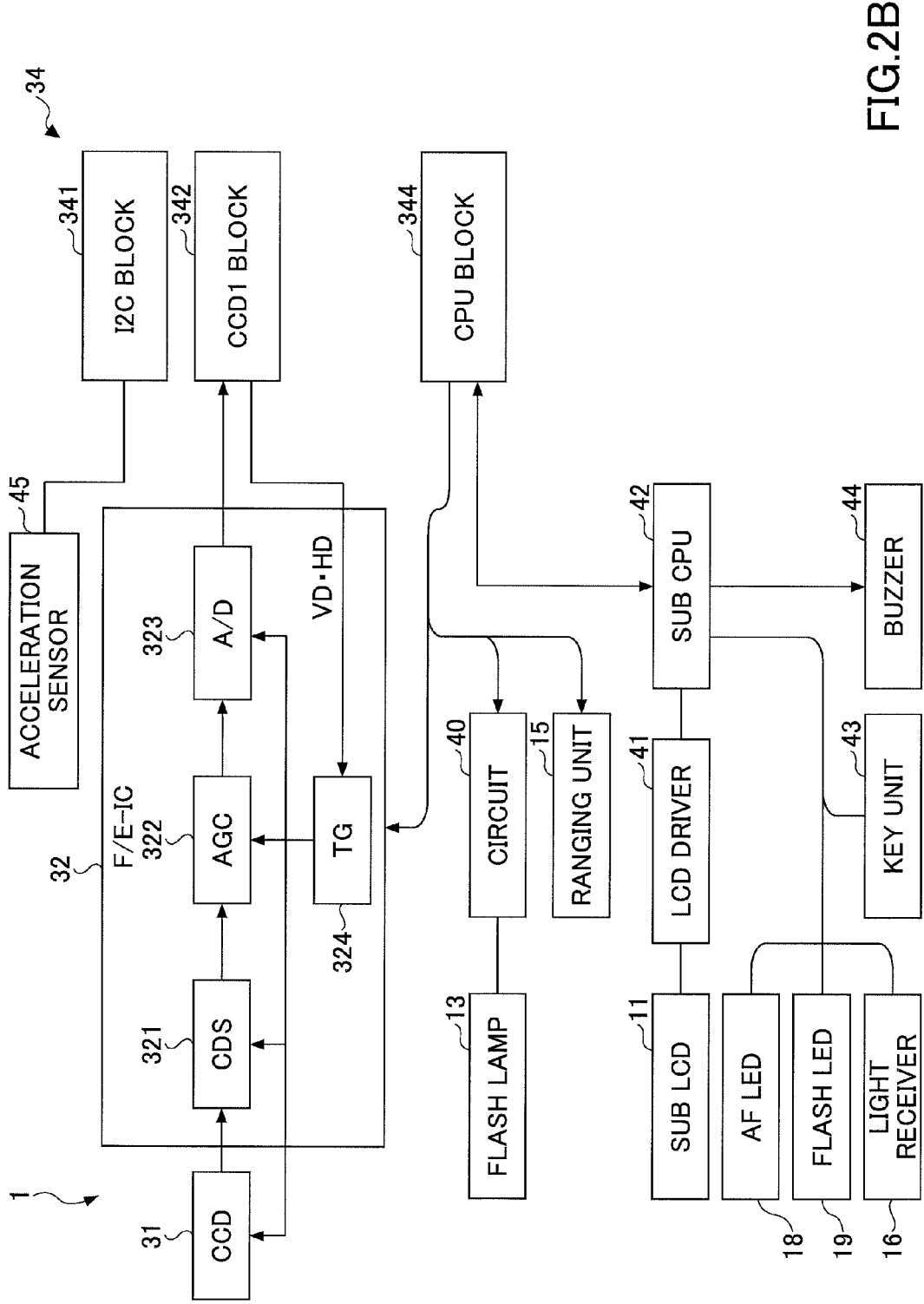
Figure 2C:
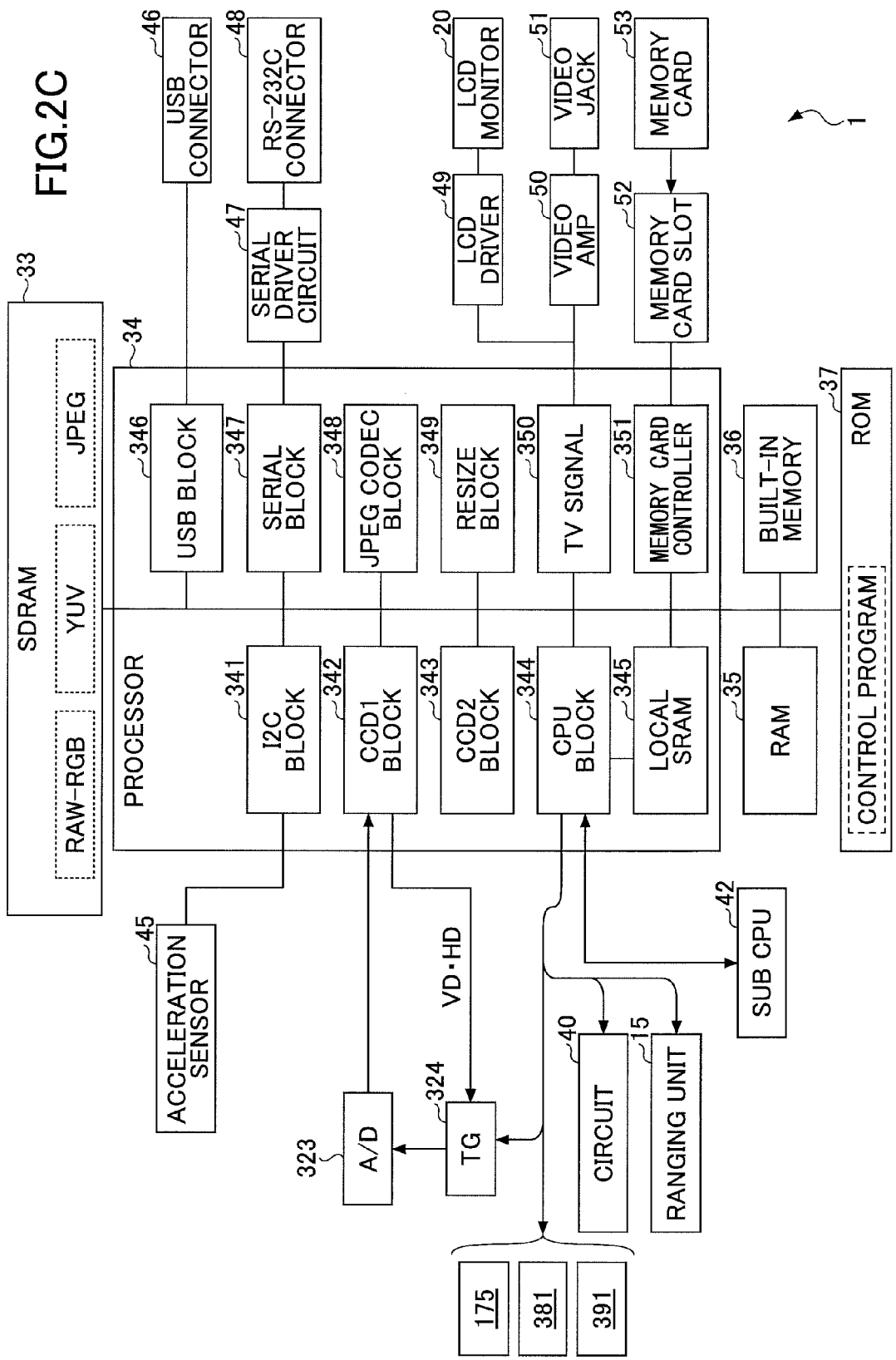

FIG. 2A to 2C are block diagrams showing an example of a system structure of the imaging device 1 of the embodiment.

The imaging device 1 further includes a Charge Coupled Device (CCD) 31, a front-end integrated circuit (F/E-IC) 32, a Synchronous Dynamic Random Access Memory (SDRAM) 33, a digital camera processor (hereinafter simply referred to as a "processor") 34, a Random Access Memory (RAM) 35, a built-in memory 36, a Read-Only Memory (ROM) 37, a voice input unit 38, an audio play unit 39, a flash lamp circuit 40 (just shown as "CIRCUIT", an LCD driver 41, a sub Central Processing Unit (CPU) 42, an operational key unit 43, a buzzer 44, an acceleration sensor 45, an Universal Serial Bus (USB) connector 46, a serial driver circuit 47, an RS-232C connector 48, an LCD driver 49, a video amplifier 50, a video jack 51, a memory card slot 52, and a memory card 53, in addition to the sub LCD 11, the flash lamp 13, the ranging unit 15, the remote control light receiver 16, the lens-barrel unit 17, the LED for AF 18, the LED for flash 19, the LCD monitor 20, which are also shown in FIG. 1A to FIG. 1C.

The lens-barrel unit 17 includes a zooming optical system 171 composed of a zoom lens 171a and a zoom motor 171b, a focusing optical system 172 composed of a focus lens 172a and a focus motor 172b, an aperture unit 173 composed of an aperture 173a and an aperture motor 173b, a mechanical shutter unit 174 composed of a mechanical shutter 174a and a mechanical shutter motor 174b, and a motor driver 175.

The F/E-IC 32 includes a Correlated Double Sampling (CDS) circuit 321, an Automatic Gain Control (AGC) circuit 322, an analog digital converter (A/D) 323, and a timing generator (TG) 324.

The CDS circuit 321 performs a correlated double sampling in order to remove noise in an image (an image signal). The AGC circuit 322 performs an automatic gain control. TG 324 generates a driving timing signal based on a vertical driving pulse VD and a horizontal driving pulse HD.

The processor 34 includes an Inter Integrated Circuit (I2C) block 341, a CCD1 signal processing block 342, a CCD2 signal processing block 343, a CPU block 344, a local Static Random Access Memory (SRAM) 345, an USB block 346, a serial block 347, a JPEG codec block 348, a resize block 349, a TV signal display block 350, and a memory card controller block 351. These blocks 341 to 351 are connected with each other via a BUS-line (not shown in the drawings).

The voice input unit 38 includes a voice recording circuit (just shown as "CIRCUIT") 381, a microphone amplifier (just shown as "AMP") 382, and a microphone 383. The audio play unit 39 includes an audio play circuit (just shown as "CIRCUIT") 391, an audio amplifier (just shown as "AMP") 392, and a speaker 393.

As described above, the imaging device 1 of the embodiment has a function of a digital camera. Specifically, as shown in FIG. 1A, the switches SW1 and SW2 provided at an upper part of the imaging device are for release and mode dial, respectively.

As shown in FIG. 1B, a cover is further provided at a side part of the imaging device 1 to cover the memory card-battery unit 12 in which the memory card 53 and a battery are installed. Images taken by the imaging device 1 may be stored in the memory card 53. The components of the imaging device 1 are driven by the battery.

Further as shown in FIG. 1B, the flash lamp 13, the optical viewfinder 14, the ranging unit 15, the remote control light receiver 16, and the lens-barrel unit 17 are provided at a front surface of the imaging device 1.

The flash lamp 13 provides light when obtaining an image. The optical viewfinder 14 helps a user to find a target or an object through the optical lenses such as the zoom lens 171a and the focus lens 172a. The remote control light receiver 16 receives a remote control signal such as infrared rays or the like sent from an external remote control device.

As shown in FIG. 1C, the optical viewfinder 14, the LED for AF 18, the LED for flash 19, the LCD monitor 20, the switch SW3 for wide-angle zoom (WIDE), the switch SW4 for telephoto zoom (TELE), the switch SW5 for displaying an obtained image or video, the switch SW6 for self-timer, the switch SW7 for a menu or confirmation (OK), the switch SW8 for the LCD monitor 20, the switch SW9 for upward movement, the switch SW10 for rightward movement, the switch SW11 for downward movement, the switch SW12 for leftward movement, and the switch SW13 for power, are provided at a back surface of the imaging device 1. The switch SW9 may also have a function to set the flash lamp 13. The switch SW11 may also have a function to set macro. The SW12 may also have a function to display an image on the LCD monitor 20 for confirmation.

Reference to FIG. 2C, the processor 34 includes a CPU and components of the imaging device 1 are controlled by the processor 34. The SDRAM 33, the RAM 35, the built-in memory 36, and the ROM 37 are provided outside the processor 34 and connected to the processor 34 via the BUS-line (not shown in the drawings). The built-in memory 36 stores an obtained image. The ROM 37 includes a control program, parameters or the like for actualizing functions of the imaging device 1 of the embodiment.

The SDRAM 33 stores a RAW-RGB image (to which white-balance correction and γ correction are performed), a YUV image (conversed to luminance data and color-difference data), a JPEG image (to which JPEG compression is performed) or the like in addition to the obtained original image.

In this embodiment, when the switch SW13 for power is ON, the control program stored in the ROM 37 is loaded into memory in the processor 34 or a memory connected to the processor 34 to be executed. The components of the imaging device 1 are controlled by the control program. In this embodiment, when the control program is executed, the RAM 35 may be used for an operational memory for the control program. It means that the control program or parameters are appropriately written in the RAM 35 and read from the RAM 35. The following processes are mainly performed by the processor 34 by executing the control program.

The motor driver 175 of the lens-barrel unit 17 is controlled by the CPU block 344 of the processor 34. The motor driver 175 drives the zoom motor 171b, the focus motor 172b, the aperture motor 173b, and the mechanical shutter motor 174b to drive the zoom lens 171a, the focus lens 172a, the aperture 173a, and the mechanical shutter 174a, respectively.

A user operates the switch SW3 for wide-angle zoom or the switch SW4 for telephoto zoom to have the zooming optical system 171 and the focusing optical system 172 focus an image of an object on light accepting surfaces of the CCD 31. The focused image of the object is converted to an image signal by the CCD 31 to be output to the F/E-IC 32.

In the F/E-IC 32, the CDS circuit 321 performs a correlated double sampling on the image signal. Then, the AGC circuit 322 performs an automatic gain control on the image signal output from the CDS circuit 321. The A/D converter 323 converts the image signal, which is an analog signal output from the AGC circuit 322, to a digital image signal. It means that the F/E-IC 32 inputs the analog image signal output from the CCD 31, performs a predetermined operation such as reducing noise, an automatic gain control or the like, converts the analog image signal to the digital image signal and then outputs the digital image signal to the CCD1 signal processing block 342 of the processor 34.

The TG 324 generates the driving timing signal for sampling of the image signal by the F/E-IC 32 based on the vertical driving pulse VD and the horizontal driving pulse HD which are fed back from the CCD1 signal processing block 342 of the processor 34.

The I2C block 341 performs a high speed communication between the ICs by a serial communication. The CCD1 signal processing block 342 performs a white-balance correction or a γ correction on the digital image signal output from the CCD 31 via the F/E-IC 32. Further, the CCD1 signal processing block 342 supplies the vertical driving pulse VD and the horizontal driving pulse HD to the TG 324, as described above. The CCD2 signal processing 343 converts the input image signal to luminance data, the color-difference data or the like by a filtering process. The CPU block 344 controls the operations of components of the imaging device 1. The functions of the CPU block 344 according to the embodiment will be explained later in detail.

The local SRAM 345 temporarily stores various data necessary to control components of the imaging device 1. The USB block 346 performs a USB communication between an external device such as a personal computer or the like. The serial block 347 performs a serial communication between an external device such as a personal computer or the like. The JPEG codec block 348 performs a JPEG compression or a JPEG expansion.

The resize block 349 reduces or enlarges an image to a predetermined size, performs interpolation or the like. The TV signal display block 350 converts the image signal to a video signal to be displayed on an external display device such as a liquid crystal monitor, TV or the like. The memory card controller block 351 controls the memory card 53 on which the obtained image is stored.

The CPU block 344 of the processor 34 is connected to the F/E-IC 32, the motor driver 175, the voice recording circuit 381, the audio play circuit 391, the flash lamp circuit 40 that controls the flash lamp 13, the ranging unit 15, and the sub CPU 42 to control these components.

For the voice input unit 38, a voice signal obtained by the microphone 383 is amplified by the microphone amplifier 382, converted to a digital signal by the voice recording circuit 381, and stored in the built-in memory 36, the memory card 53 or the like, based on control by the CPU block 344.

For the audio play unit 39, voice data previously stored in the ROM 37 or the like is converted by the audio play circuit 391 based on a control by the CPU block 344, amplified by the audio amplifier 392, and output from the speaker 393.

The ranging unit 15 includes a two-dimensional sensor or the like as a ranging sensor and measures a distance to a predetermined object within a field of view of the imaging device 1 by the two-dimensional sensor or the like. The ranging unit 15 may measure the distance using plural two-dimensional sensors or the like. For example, the ranging unit 15 may measure the distance using parallax between images obtained by the optical lenses such as the zoom lens 171a and the focus lens 172a and image sensors of the CCD 31 or the like, by triangulation or the like.

The sub CPU 42 is connected to the sub LCD 11 via the LCD driver 41, the LED for AF 18, the LED for flash 19, the remote control light receiver 16, the operational key unit 43, and the buzzer 44 to control these components. The sub CPU 42 monitors signal inputs to the remote control light receiver 16 or the operational key unit 43. The operational key unit 43 may be composed of the switches SW1 to SW13.

The acceleration sensor 45, mounted on a Printed Circuit Board (PCB), is connected to the I2C block 341. The acceleration sensor 45 outputs acceleration data of two orthogonal axes in an X-direction and in a Y-direction and temperature data. The acceleration sensor 45 calculates an inclination of the imaging device 1 such as a roll angle or a pitch angle based on the acceleration data to output to the I2C block 341 and to be displayed on the LCD monitor 20 or the like. The roll angle θ with respect to a horizontal plane can be obtained by the following equation (1).

$$\theta[\text{deg}]=180/\pi \times \arctan((Y0-G0)/(X0-G0)) \quad (1)$$

Here, X0 expresses acceleration data when the gravity is zero.

In this embodiment, it is assumed that the roll angle θ of the imaging device 1 is 0° when the imaging device 1 takes the position as shown in FIG. 1B or FIG. 1C. Further, it is assumed that the imaging device 1 is inclined in a positive direction when the LCD monitor 20 is inclined in a clockwise direction, while it is assumed that the imaging device 1 is inclined in a negative direction when the LCD monitor 20 is inclined in a counterclockwise direction.

The USB block 346 is connected to the USB connector 46. The serial block 347 is connected to the RS-232C connector 48 via the serial driver circuit 47. The imaging device 1 communicates with an external device such as a personal computer or the like via the USB block 346 or the serial block 347.

The TV signal display block 350 is connected to the LCD driver 49 and the video amplifier 50. The LCD driver 49 drives the LCD monitor 20. The video amplifier 50 amplifies the video signal and performs an impedance matching. The LCD monitor 20 is connected to the LCD driver 49. The video jack 51 to be connected with an external monitor device such as a television or the like is connected to the video amplifier 50.

The LCD monitor 20 is provided to display an object while obtaining an image, an obtained image, an image stored in the memory card 53, the built-in memory 36 or the like. The LCD monitor 20 may be composed to have a function of an input device such as a touch panel or the like. In such a case, a predetermined object may be specified by touching the image displayed on the LCD monitor 20, or various instructions can be input through the LCD monitor 20.

The memory card slot 52 is connected to the memory card controller block 351. The imaging device 1 may store and read out an image in the memory card 53 which is inserted in the memory card slot 52. The lens-barrel unit 17, the CCD 31, the F/E-IC 32, and the CCD1 signal processing block 342 of the imaging device 1 function as an image obtaining unit.

Instead of the CCD 31, Complementary Metal Oxide Semiconductors (CMOS) may be used. In such a case, a CMOS1 signal processing block and a CMOS2 signal processing block may be used instead of the CCD1 signal processing block 342 and the CCD2 signal processing block 343, respectively.

(Operation of Electronic Image Stabilization)

Before describing an operation of electronic image stabilization by the imaging device 1 of the embodiment, a general operation of electronic image stabilization will be explained for explanation purposes.

Figure 4:
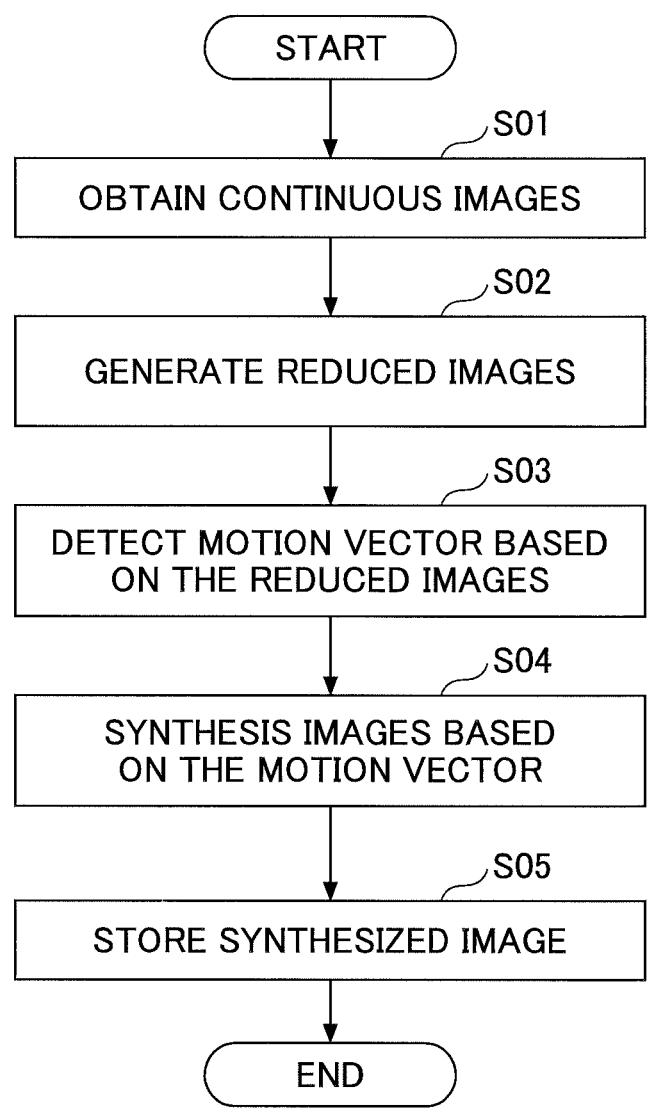
FIG. 4 is a flowchart showing an example of an operation of electronic image stabilization.

FIG. 4 is a flowchart showing an example of an operation of electronic image stabilization.

First, plural continuous images, in this case four images, for example, of an object are obtained (S01). Then, the four images obtained in step S01 are reduced to four reduced images, each having a predetermined size, for detecting a motion vector respectively (S02).

Thereafter, a motion vector is detected based on the four reduced images obtained in step S02 by aligning the reduced images in a time-series and comparing corresponding points of the object in respective successive images (S03). Then, the images obtained in step S01, each having the original size, are synthesized based on the motion vector obtained in step S03 to obtain a synthesized image (S04). The synthesized image is then stored in the memory or the like (S05).

With this method, when performing the electronic image stabilization, four continuous images are obtained. Then, four reduced images having a size smaller than the original obtained images are generated. Thereafter, a relative motion vector is detected based on the reduced images. Then, the original obtained images are synthesized based on the detected motion vector to generate the synthesized image. Thereafter, the synthesized image is stored in a memory unit such as the built-in memory 36, the memory card 53 inserted in the memory card slot 52, or the like.

Figure 5:
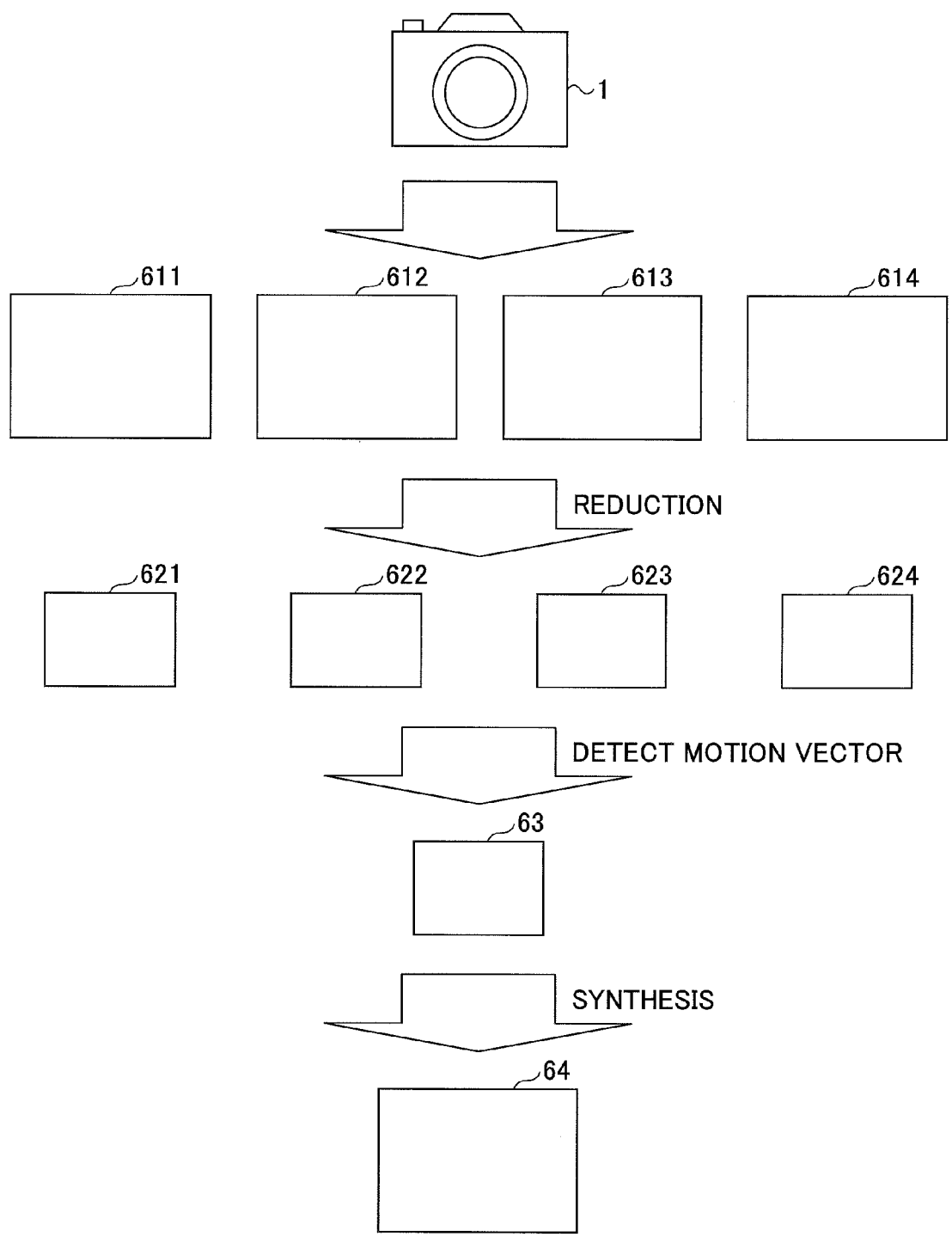
FIG. 5 is a view for explaining electronic image stabilization.

FIG. 5 is a view for explaining the electronic image stabilization. Four images 611 to 614 which are obtained successively are respectively reduced to a predetermined size to be reduced images 621 to 624, respectively. The reduced images 621 to 624 are overlapped (63) and used for detecting the motion vector for the electronic image stabilization.

The original images 611 to 614 are synthesized to correct the blur or the like caused by hand movement or camera shake when obtaining the images 611 to 614 based on the motion vector obtained based on the reduced images 621 to 624. The synthesized image 64 may be stored in a memory unit such as a built-in memory, a memory card or the like.

Figure 6:
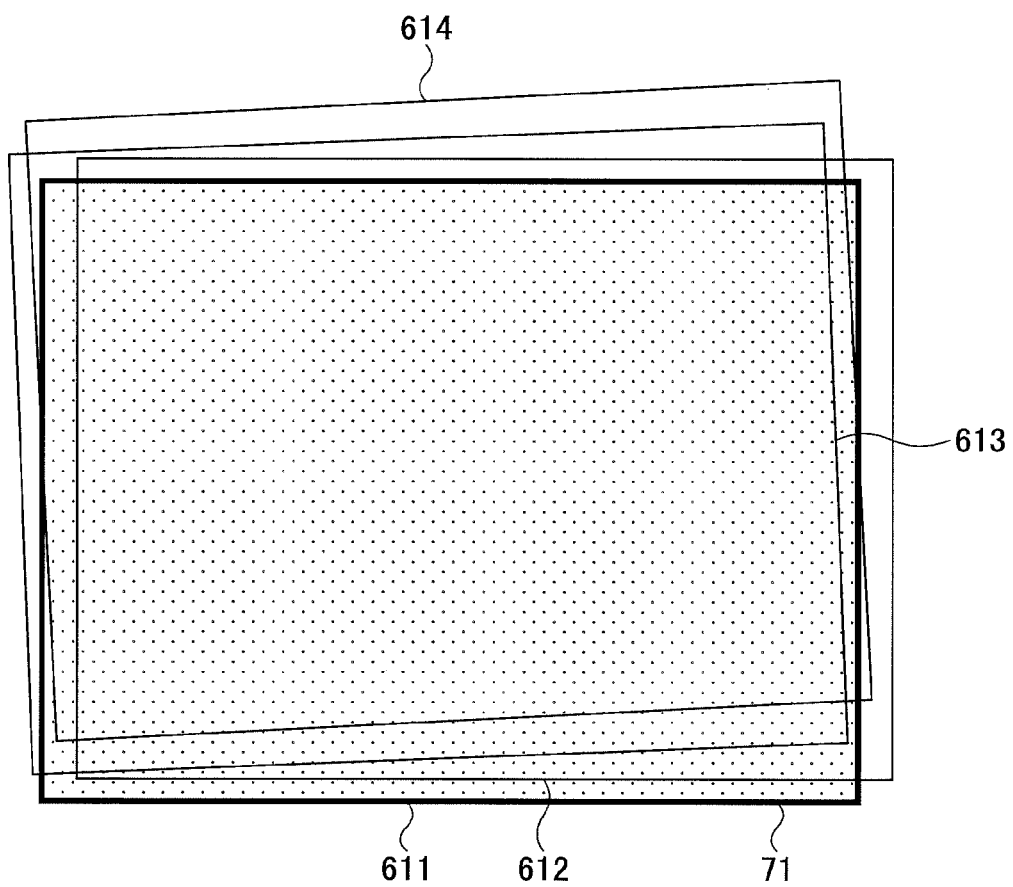
FIG. 6 is a view for explaining synthesizing of images.

FIG. 6 is a view for explaining synthesizing of images.

In this example as shown in FIG. 6, viewing angles of the four images 611 to 614 do not match with each other. However, when synthesizing the images 611 to 614, one of the images, in this case the image 611, which is obtained first, is set as a reference. The area where the two or more images overlap is synthesized. In other words, the area where the two or more images overlap becomes a synthesizable area, so that it is not necessary to use the four images for all the areas. Therefore, the one to four images are partially used to obtain the synthesized image.

In FIG. 6, the synthesized image 71 obtained by the images 611 to 614 is also shown as expressed by dots.

Generally, when detecting the motion vector, the larger the image size is, the higher the accuracy of the motion vector becomes so that the blur or the like can be precisely corrected. However, when detecting the motion vector by images of a larger size, it takes a longer time. Therefore, generally, the size of images for detecting the motion vector is set equal as a Video Graphics Array (VGA: for example, 640 (horizontal)×480 (vertical) and total pixel number of 307200).

However, there may be a case where a motion vector with a higher accuracy is required, or a case where a faster speed is required based on a condition in obtaining an image such as a zoom position or the like of the imaging device 1, or a obtained image such as a kind of an object included in the image or the like. Therefore, it is desirable to arbitrary change the image size of the images (hereinafter referred to as "reduced images") used for detecting the motion vector based on the requirement.

In this embodiment, the CPU block 344 determines the image size of reduced images used for detecting a motion vector based on photographing information such as setting information of the imaging device 1 in obtaining an image, or characteristic information of an obtained image.

The photographing information may be capable of defining or indicating a necessary accuracy for the motion vector. The CPU block 344 determines the image size of reduced images for detecting the motion vector in accordance with the necessary accuracy of the photographing information such that the higher the necessary accuracy, the larger the image size becomes.

Specifically, when performing electronic image stabilization, when the CPU block 344 detects that the switch for release SW1 is pushed, four continuous (successive) images are obtained and stored in the SDRAM 33.

Then, four reduced images having the image size determined based on the photographing information are generated by reducing the obtained four images, respectively. Thereafter, a motion vector is detected based on the reduced images. Subsequently, a synthesized image is generated based on the obtained images and the detected motion vector.

The generated synthesized image is stored in the built-in memory 36 or the memory card 53 inserted in the memory card slot 52.

(Functional Structure of CPU Block 344)

Figure 3:
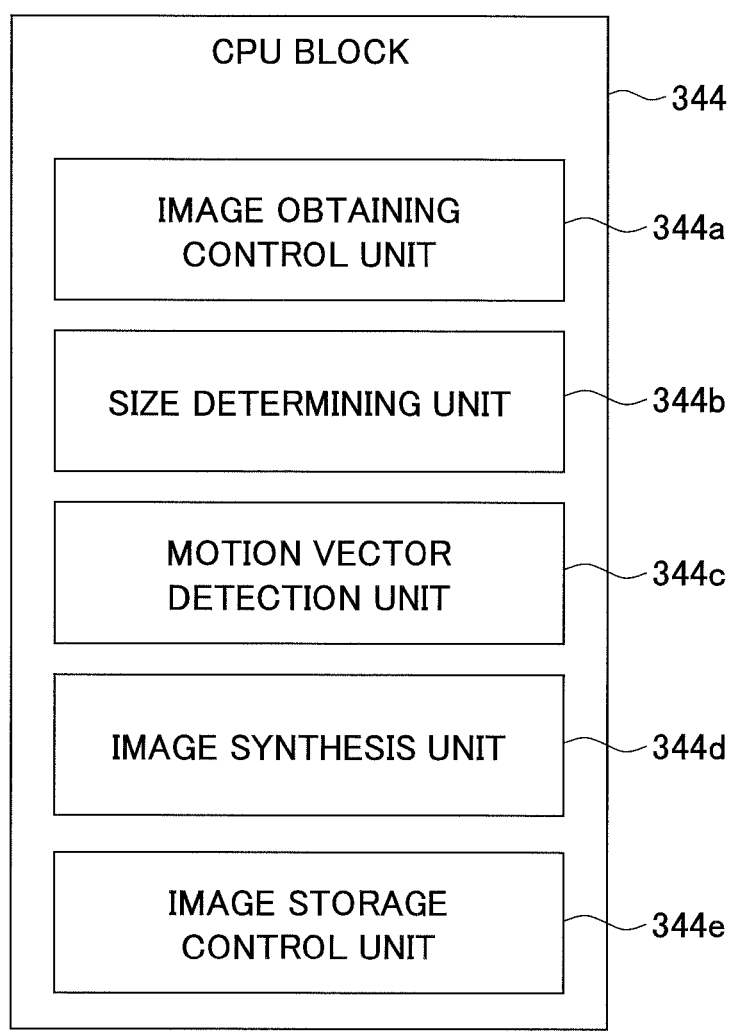
FIG. 3 is a functional block diagram of a CPU block.

The structure of the CPU block 344 of the embodiment will be explained in detail. FIG. 3 is a functional block diagram of the CPU block 344.

The CPU block 344 includes an image obtaining control unit 344a, a size determining unit 344b, a motion vector detection unit 344c, an image synthesis unit 344d, and an image storage control unit 344e.

The image obtaining control unit 344a controls the components of the imaging device 1 to obtain continuous plural images of a predetermined number, which is previously set, from the CCD 31.

The image obtaining control unit 344a may determine whether an electronic image stabilization mode is selected or not before obtaining the plural images. Then, if the electronic image stabilization mode is selected, the image obtaining control unit 344a controls the components of the imaging device 1 to obtain the plural images. On the other hand, if the electronic image stabilization mode is not selected, the image obtaining control unit 344a may control the components of the imaging device 1 to obtain a single image, as a normal mode. The user of the imaging device 1 may set the mode by operating the switch SW2 for mode dial.

The size determining unit 344b determines the image size of reduced images for detecting a motion vector based on the photographing information such as the setting information of the imaging device 1 in obtaining the continuous images, or the characteristic information of the obtained images.

Specifically, the setting information of the imaging device 1 in obtaining an image may be a zoom position, ISO speed, a focus position, F-number of lens, parameter for white-balance, γ curve used in γ correction, parameter for aperture compensation, parameter for noise reduction, parameter for distortion correction or the like.

The setting information of the imaging device 1 in obtaining the images may be obtained and stored with the obtained images.

For the setting information, the zoom position may be used. When the zoom position is at a telephoto side, large blurring may easily occur and an object included in an obtained image may be larger so that precise detection of a motion vector is necessary. However, on the other hand, when the zoom position is at a wide-angle side, large blurring does not easily occur and an object included in an obtained image may be small, so that a precise detection of a motion vector is not as necessary. Therefore, it is desirable to set the image size, reduction ratio or the like, of reduced images based on the zoom position.

The characteristic information of the images may be, for example, the contrast of an obtained image, or whether a predetermined shape or object, such as a face of a person, a specific structure, an animal or the like, is included in an obtained image.

For the characteristic information, the contrast of an obtained image may be used. When the contrast of the obtained image is high, the boundary between objects included in the image becomes clearer so that a precise detection of a motion vector is necessary. Therefore, it is desirable to set the image size, the reduction ratio or the like, of reduced images based on the contrast of the obtained image.

Further, the size determining unit 344b may determine the image size of reduced images using both the setting information and the characteristic information.

Although not shown in the drawings, the imaging device 1 may store a table in which photographing information (setting information or characteristic information) and image sizes of reduced images (a reduction ratio, an enlargement ratio, or the like) for detecting a motion vector corresponding with each other. The image size may be expressed as resolution as well.

The size determining unit 344b generates reduced images, having the determined image size, based on the obtained images. At this time, the size determining unit 344b may control the resize block 349 to generate the reduced images by reducing the obtained images to the determined image size.

The motion vector detection unit 344c detects a motion vector of the reduced images. With this, an appropriate motion vector can be detected based on the setting information of the imaging device 1 or the characteristic information of the obtained images.

The image synthesis unit 344d synthesizes the obtained images based on the motion vector detected by the motion vector detection unit 344c to output a single synthesized image or plural synthesized images.

The image storage control unit 344e controls storage of the images obtained by the image obtaining control unit 344a, the reduced images generated by the size determining unit 344b, the synthesized image generated by the image synthesis unit 344d or the like in the SDRAM 33, the RAM 35, the built-in memory 36, the memory card 53 inserted in the memory card slot 52, or the like.

The components of the CPU block 344 actuate the electronic image stabilization by the imaging device 1 of the embodiment as will be explained later.

The method of detecting the motion vector or synthesizing the images may not be limited to the above described method, and may be performed in accordance with techniques disclosed in Patent Document 1, U.S. Pat. No. 7,773,819, Japanese Laid-open Patent Publication No. 2006-157568, and U.S. Pat. No. 7,903,155 or the like.

The example of the operation of the electronic image stabilization by the imaging device 1 of the embodiment is explained in detail.

First Example

Figure 7:
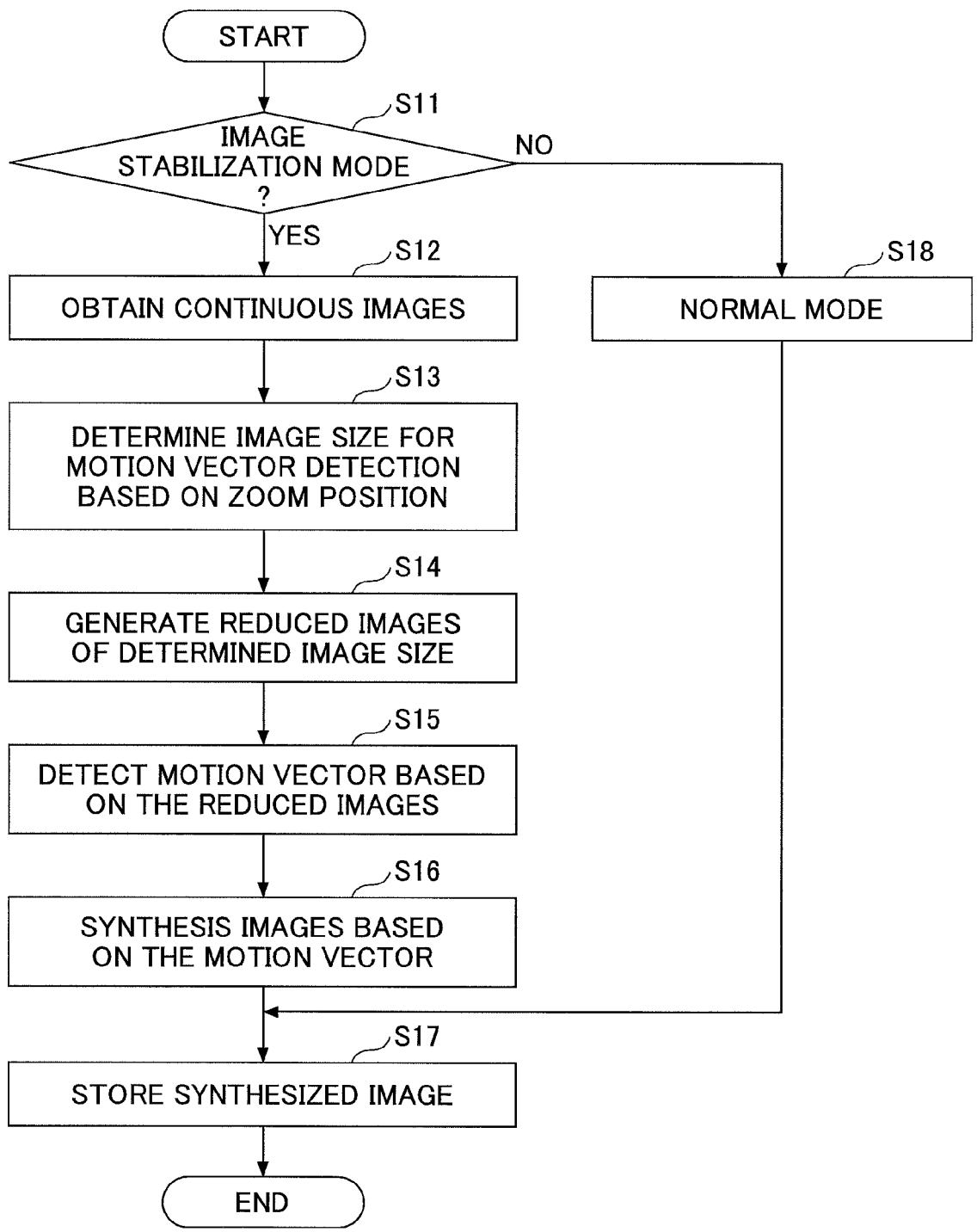
FIG. 7 is a flowchart showing a first example of an operation of electronic image stabilization by the imaging device of the embodiment.

FIG. 7 is a flowchart showing a first example of an operation of electronic image stabilization by the imaging device 1 of the embodiment.

Generally, when obtaining an image, when the image is obtained with telephoto, compared with a case when the image is obtained with wide-angle, an object becomes larger in the image and the image becomes a more detailed graphic. Therefore, in this case, when the image is obtained with telephoto, it is necessary to detect the motion vector with a higher accuracy and it may be better to set the image size of the reduced images for obtaining the motion vector larger compared with the case when the image is obtained with wide-angle.

Thus, in the first example, the image size of the reduced images for obtaining a motion vector is set based on the zoom position of the imaging device 1 where the image size of the reduced images is set larger when the zoom position is set at the telephoto side compared with the case when the zoom position is set at the wide-angle side. The zoom position may be set in the setting information so that the size determining unit 344b of the CPU block 344 can determine the zoom position of the imaging device 1 based on the setting information.

Reference to FIG. 7, when the switch for release SW1 is pushed, the image obtaining control unit 344a of the CPU block 344 determines whether the electronic image stabilization mode is selected for the imaging device 1 (S11). When it is determined that the electronic image stabilization mode is selected (YES in S11), the image obtaining control unit 344a controls the components of the imaging device 1 to obtain plural images, four images in this example, (S12), and stores the obtained images (image data in an image signal form) in the SDRAM 33, for example. At this time, the setting information including the zoom position is also obtained and stored in the SDRAM 33 with the obtained images in correspondence with each other.

The size determining unit 344b of the CPU block 344 determines the image size of reduced images for detecting a motion vector, which will be generated by reducing the obtained images stored in the SDRAM 33.

In this example, the size determining unit 344b determines the image size based on the zoom position of the imaging device 1 when the four images are obtained. Specifically, the size determining unit 344b refers to the setting information stored in the SDRAM 33 to obtain the zoom position. Further, the imaging device may include a table in which zoom positions and image sizes of reduced images for detecting a motion vector correspond with each other. By referring to the table, the size determining unit 344b determines the image size of images for motion vector detection (S13).

Then, the size determining unit 344b of the CPU block 344 reduces the size of the four images obtained in step S12 to have the image size determined in step S13 to generate reduced images (S14). Subsequently, the motion vector detection unit 344c detects a motion vector based on the images for motion vector detection (S15).

Then, the image synthesis unit 344d of the CPU block 344 synthesizes the images obtained in step S12 based on the motion vector obtained in step S15 to generate a synthesized image (S16).

When it is determined that the electronic image stabilization mode is not selected (NO in S11), when the switch for release SW1 is pushed, the image obtaining control unit 344a of the CPU block 344 obtains a single image in a normal mode (S18).

The synthesized image generated in step S16, or the image obtained in step S18 is stored in the built-in memory 36, the memory card 53 inserted in the memory card slot 52 or the like (S17).

As described above, according to the first example of the embodiment, the CPU block 344 is capable of generating an image appropriately corrected by the electronic image stabilization with an appropriate accuracy with a higher speed based on the zoom position (setting information) of the imaging device 1.

The number of images for the continuous images used for the operation of the electronic image stabilization is not limited to four, as long as it is two or more.

Second Example

Figure 8:
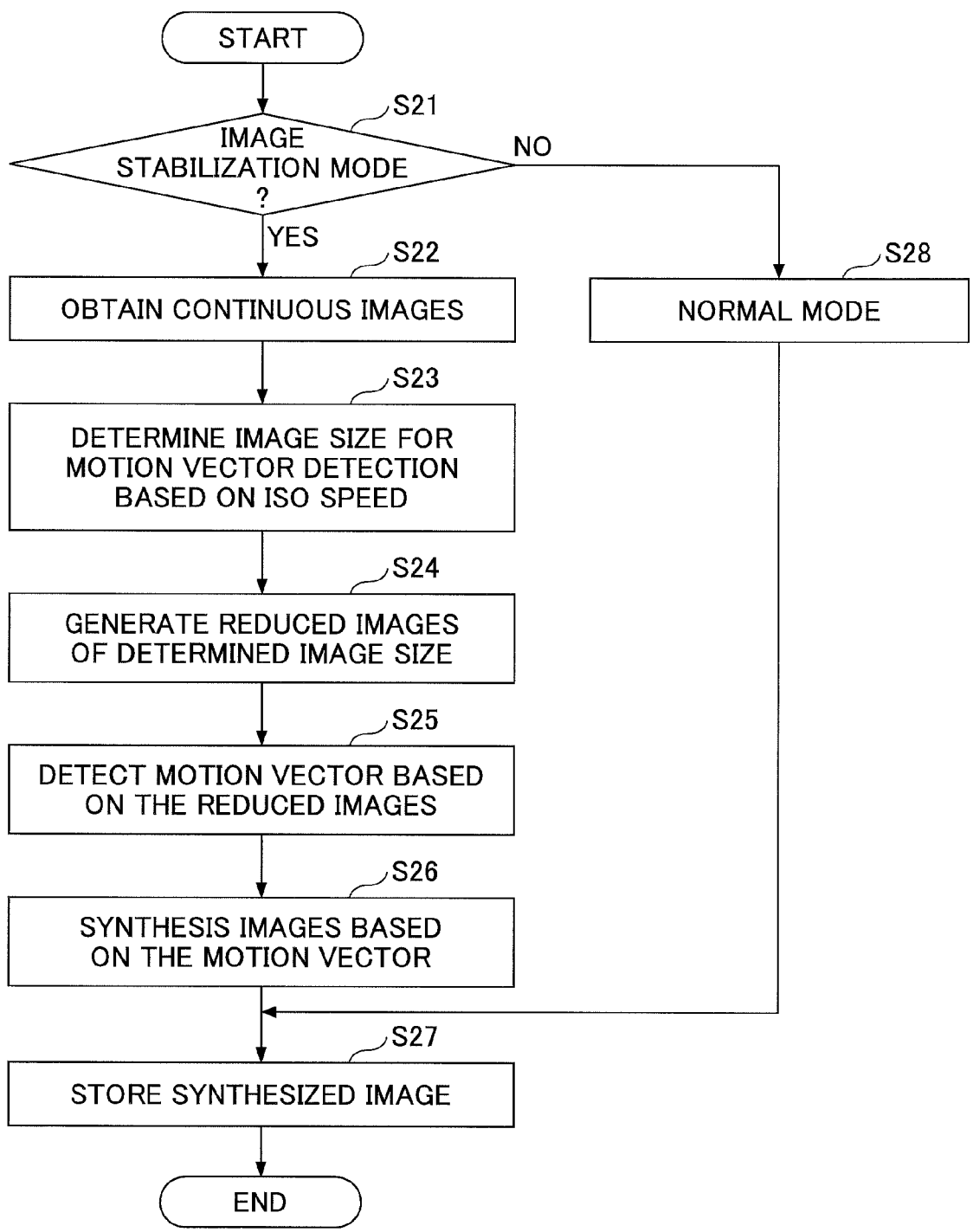
FIG. 8 is a flowchart showing a second example of an operation of electronic image stabilization by the imaging device of the embodiment.

FIG. 8 is a flowchart showing a second example of the operation of the electronic image stabilization by the imaging device 1 of the embodiment.

Generally, when obtaining an image, when the image is obtained with a higher ISO speed, compared with a case when the ISO speed is lower, the signal-noise ratio (S/N ratio) of image noise tends to become worse (lower) or the shutter speed tends to become faster. Further when the S/N ratio of the image noise becomes lower, in other words when the image noise becomes larger, the blur in the image tends to become indistinctive because of the influence by the noise.

However, when the image is obtained with a lower ISO speed, the S/N ratio of image noise tends to become higher so that it is necessary to detect the motion vector with a higher accuracy and it may be better to set the image size of the reduced images for obtaining the motion vector larger.

Thus, in the second example, the image size of reduced images for obtaining a motion vector is set based on the ISO speed of obtained images where the lower the ISO speed becomes the larger the image size becomes. The ISO speed may be set in the setting information so that the size determining unit 344b of the CPU block 344 can determine the ISO speed of the imaging device 1 based on the setting information.

Reference to FIG. 8, when the switch for release SW1 is pushed, the image obtaining control unit 344a of the CPU block 344 determines whether the electronic image stabilization mode is selected for the imaging device 1 (S21). When it is determined that the electronic image stabilization mode is selected (YES in S21), the image obtaining control unit 344a controls components of the imaging device 1 to obtain plural images, four images in this example, when the switch for release SW1 is pushed (S22), and stores the obtained images in the SDRAM 33, for example. At this time, setting information including the ISO speed is also obtained and stored in the SDRAM 33 with the obtained images in correspondence with each other.

The size determining unit 344b of the CPU block 344 determines the image size of reduced images for detecting a motion vector, which will be generated by reducing the obtained images stored in the SDRAM 33.

In this example, the size determining unit 344b determines the image size based on the ISO speed of the imaging device 1 when the four images are obtained. Specifically, the size determining unit 344b refers to the setting information stored in the SDRAM 33 to recognize the ISO speed. Further, the imaging device may include a table in which ISO speeds and image sizes of reduced images for detecting a motion vector correspond with each other. By referring to the table, the size determining unit 344b determines the image size of images for motion vector detection (S23).

Then, the size determining unit 344b of the CPU block 344 reduces the size of the four images obtained in step S22 to have the image size determined in step S23 to generate images for motion vector detection (S24). Subsequently, the motion vector detection unit 344c detects a motion vector based on the images for motion vector detection (S25). Then, the image synthesis unit 344d of the CPU block 344 synthesizes the images obtained in step S22 based on the motion vector obtained in step S25 to generate a synthesized image (S26).

When it is determined that the electronic image stabilization mode is not selected (NO in S21), when the switch for release SW1 is pushed, the image obtaining control unit 344a of the CPU block 344 obtains a single image in a normal mode (S28).

The synthesized image generated in step S26, or the image obtained in step S28 is stored in the built-in memory 36, the memory card 53 inserted in the memory card slot 52 or the like (S27).

As described above, according to the second example of the embodiment, the CPU block 344 is capable of generating an image appropriately corrected by the electronic image stabilization with an appropriate accuracy with a higher speed based on the ISO speed (setting information) of the imaging device 1.

The number of images for the continuous images used for the operation of the electronic image stabilization is not limited to four, as long as it is two or more.

The setting information is not limited to the zoom position or the ISO speed, and other setting information such as conditions of the imaging device 1 when taking an image as described above may be used as well. Further, a combination of plural kinds of setting information may also be used.

Third Example

Figure 9:
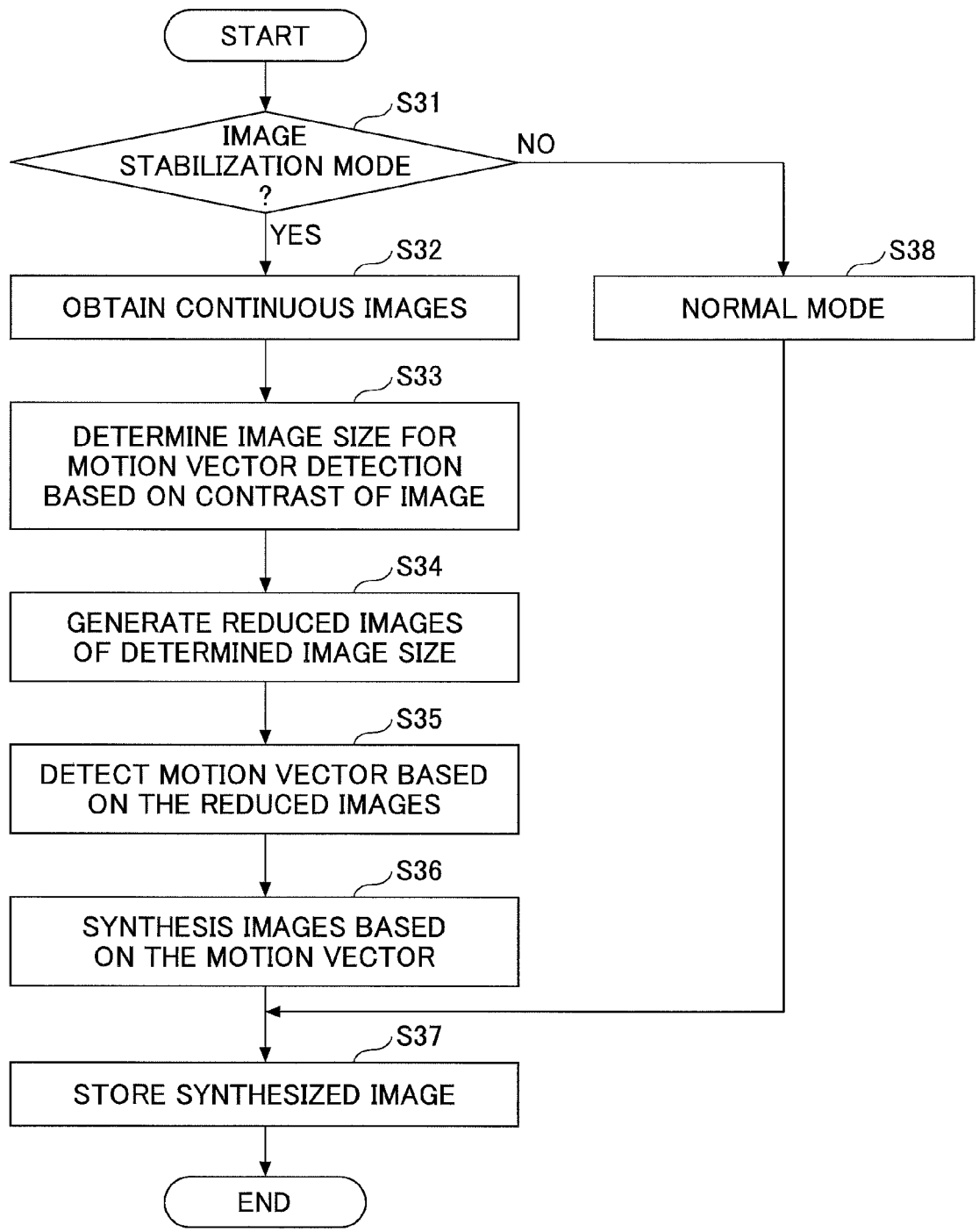
FIG. 9 is a flowchart showing a third example of an operation of electronic image stabilization by the imaging device of the embodiment.

FIG. 9 is a flowchart showing a third example of the operation of the electronic image stabilization by the imaging device 1 of the embodiment.

Generally, when the contrast of the obtained image is high, the boundary between a bright part and a dark part becomes clearer so that it is easily recognized if there is a positional displacement when synthesizing the obtained images. Therefore, in this case, it is necessary to detect the motion vector with a higher accuracy and it may be better to set the image size of the reduced images for obtaining the motion vector larger.

When, on the other hand, the contrast of the obtained image is lower, the boundary between a bright part and a dark part becomes unclear so that it is hardly recognized even if there is just a slight positional displacement when synthesizing the obtained images. Therefore, in this case, it is not necessary to detect the motion vector with a higher accuracy and it may be better to set the image size of the reduced images for obtaining the motion vector smaller to shorten the operation period.

Thus, in the third example, the image size of reduced images for obtaining a motion vector is set based on the contrast of obtained images where the higher the contrast, the larger the image size becomes.

Reference to FIG. 9, when the switch for release SW1 is pushed, the image obtaining control unit 344a of the CPU block 344 determines whether the electronic image stabilization mode is selected for the imaging device 1 (S31). When it is determined that the electronic image stabilization mode is selected (YES in S31), the image obtaining control unit 344a controls the components of the imaging device 1 to obtain plural images, four images in this example, (S32), and stores the obtained images in the SDRAM 33, for example.

The size determining unit 344b of the CPU analyzes one of the four images stored in the SDRAM 33, which may be the image obtained first, to determine the contrast. Then, the size determining unit 344b determines the image size of reduced images for detecting a motion vector based on the contrast (S33).

Alternatively, the contrast of the image may be determined based on plural images among the four images, for example, the images obtained first and last (the first image and the fourth image). In this case, the contrast of each of the images is determined first, then, the average is calculated based on the contrasts of the images. With this, the contrast of the plural images can be obtained with a higher accuracy.

Then, the size determining unit 344b of the CPU block 344 reduces the size of the four images obtained in step S32 to have the image size determined in step S33 to generate reduced images (S34). Subsequently, the motion vector detection unit 344c detects a motion vector based on the images for motion vector detection (S35).

Then, the image synthesis unit 344d of the CPU block 344 synthesizes the images obtained in step S32 based on the motion vector obtained in step S35 to generate a synthesized image (S36).

When it is determined that the electronic image stabilization mode is not selected (NO in S31), when the switch for release SW1 is pushed, the image obtaining control unit 344a of the CPU block 344 obtains a single image in a normal mode (S38).

The synthesized image generated in step S36, or the image obtained in step S38 is stored in the built-in memory 36, the memory card 53 inserted in the memory card slot 52 or the like (S37).

As described above, according to the third example of the embodiment, the CPU block 344 is capable of generating an image appropriately corrected by the electronic image stabilization with an appropriate accuracy with a higher speed based on the contrast (characteristic information) of the image.

The number of images for the continuous images used for the operation of the electronic image stabilization is not limited to four, as long as it is two or more.

Fourth Example

Figure 10:
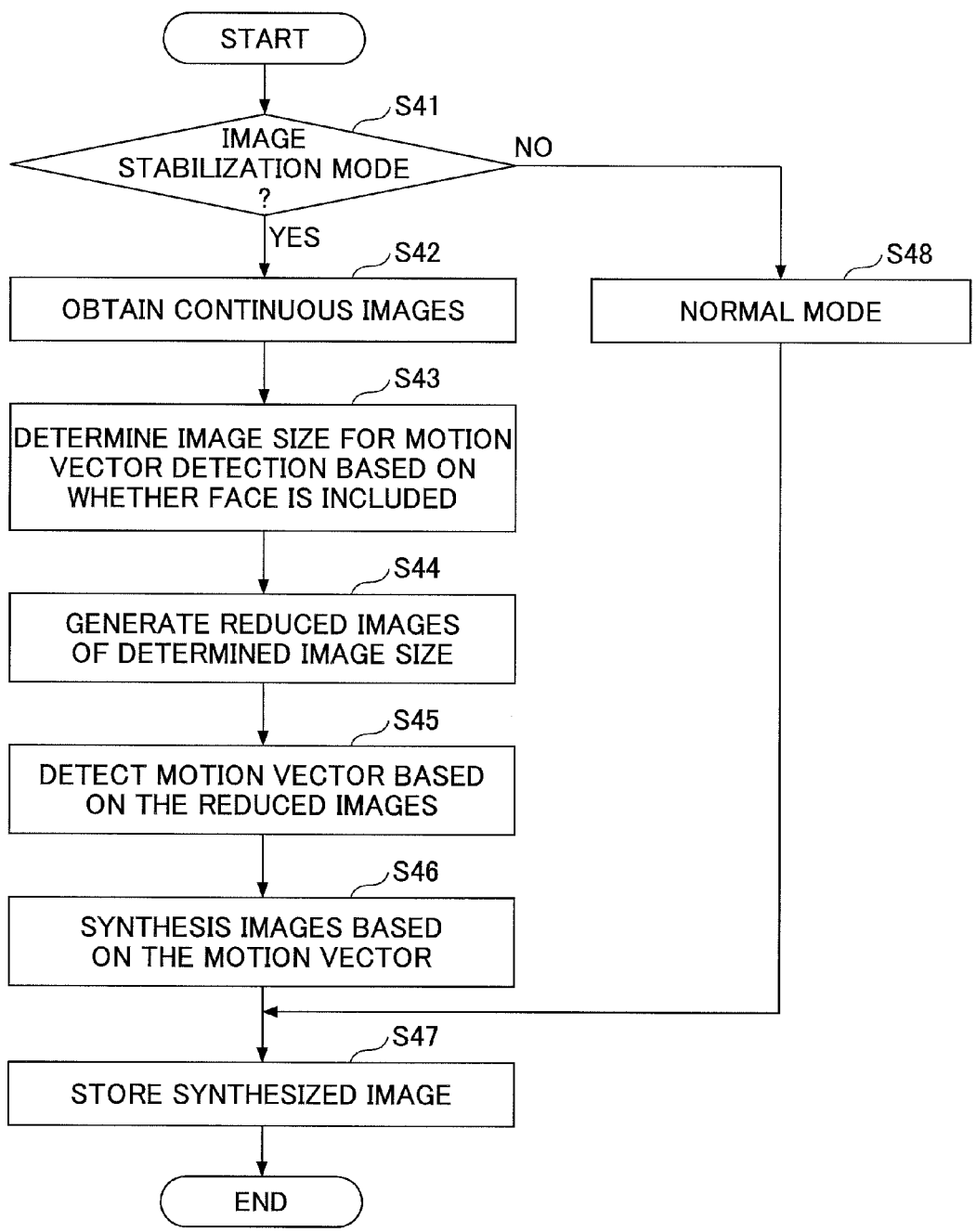
FIG. 10 is a flowchart showing a fourth example of an operation of electronic image stabilization by the imaging device of the embodiment.

FIG. 10 is a flowchart showing a fourth example of the operation of the electronic image stabilization by the imaging device 1 of the embodiment.

Generally, when a face of a person or the like is included in the obtained image, it may be necessary to maintain the image precisely. Therefore, in this case, it is necessary to detect the motion vector with a higher accuracy and it may be better to set the image size of the reduced images for obtaining the motion vector larger.

Reference to FIG. 10, when the switch for release SW1 is pushed, the image obtaining control unit 344a of the CPU block 344 determines whether the electronic image stabilization mode is selected for the imaging device (S41). When it is determined that the electronic image stabilization mode is selected (YES in S41), the image obtaining control unit 344a controls the components of the imaging device 1 to obtain plural images, four images in this example, (S42), and stores the obtained image in the SDRAM 33, for example.

The size determining unit 344b of the CPU analyzes one of the four images stored in the SDRAM 33, which may be the image obtained first, to determine whether a face of a person is included. Then, the size determining unit 344b determines the image size of reduced images for detecting a motion vector based on whether the face of a person is included (S43). Specifically, when it is determined that the face of a person is included, the size determining unit 344b sets the image size of reduced images larger.

In step S43, when it is determined that the face of a person is included, the size determining unit 344b may determine the image size of reduced images based on the area size for the face, the position of the face or the number of faces.

Alternatively, whether a face of a person is included may be determined based on all of the obtained images and when it is determined that the face of a person is included in at least one of the images, the size determining unit 344b may set the image size of reduced images larger. Further alternatively, when it is determined that a face of a person is included in the plural images, the size determining unit 344b may set the image size of reduced images based on one of the plural images, for example, an earlier one.

The characteristic information may not be limited to a face of a person, but a predetermined object other than a face of a person may be previously set, and the size determining unit 344b may determine the image size of reduced images based on whether the predetermined object is included in the image or not.

Then, the size determining unit 344b of the CPU block 344 reduces the size of the four images obtained in step S42 to have the image size determined in step S43 to generate reduced images (S44). Subsequently, the motion vector detection unit 344c detects a motion vector based on the images for motion vector detection (S45).

Then, the image synthesis unit 344d of the CPU block 344 synthesizes the images obtained in step S42 based on the motion vector obtained in step S45 to generate a synthesized image (S46).

When it is determined that the electronic image stabilization mode is not selected (NO in S41), when the switch for release SW1 is pushed, the image obtaining control unit 344a of the CPU block 344 obtains a single image in a normal mode (S48).

The synthesized image generated in step S46, or the image obtained in step S48 is stored in the built-in memory 36, the memory card 53 inserted in the memory card slot 52, or the like (S47).

As described above, according to the fourth example of the embodiment, the CPU block 344 is capable of generating an image appropriately corrected by the electronic image stabilization with an appropriate accuracy with a higher speed based on whether the face of a person is included in the obtained image (characteristic information).

The number of images for the continuous images used for the operation of the electronic image stabilization is not limited to four, as long as it is two or more.

The characteristic information may not be limited to the contrast of the image or whether the face of a person is included in the image and other characteristic information of the image may be used as well. Further, a combination of plural kinds of characteristic information may also be used.

Further, the information as described in the first to fourth examples may be arbitrary combined to obtain a same effect. Therefore, not limited to the above examples, a combination of any setting information and any characteristic information may be used for the operation of the electronic image stabilization of the embodiment.

Further, for example, when the zoom position of the imaging device 1 is at the telephoto side where a precise detection of a motion vector is necessary, the reduction ratio of the image size of reduced images may be ½ size for both the vertical direction and the horizontal direction (reduction ratio of 25%). When, on the other hand, the zoom position is at the wide-angle side where a precise detection of a motion vector is not as necessary, the reduction ratio may be ¼ for both the vertical direction and the horizontal direction (reduction ratio of 6.25%). These are just examples and the reduction ratio or the enlargement ratio may be arbitrary set based on various photographing information.

Further alternatively, the number of the images used for detecting the motion vector, or generating the synthesized image may be arbitrary set provided the number is two or more. Further, alternatively, the synthesizable area may be based on two or more images. Further, alternatively, the reference image when used at synthesizing the images may be the image other than the image which is obtained first.

The operation of the electronic image stabilization using the imaging device 1 as described above may be actualized by a program executable by a computer. By installing the program in a device including the hardware structure as shown in FIG. 2A to FIG. 2C and executing the program by the processor 34 or the like, the operation of the imaging device 1 can be actualized.

Further, the table in which photographic information (setting information or characteristic information) and the image sizes of reduced images (a reduction ratio, an enlargement ratio, or the like) for detecting a motion vector corresponding with each other may be included not in the imaging device 1, but instead may be stored in an external apparatus with which the imaging device 1 is capable of communication. In this case, the imaging device 1 may obtain the image size from the external apparatus by sending the photographic information to the external apparatus.

As described above, according to the embodiment, an image appropriately corrected by the electronic image stabilization can be obtained. Specifically, the size of reduced images for detecting the motion vector is determined based on the photographic information which is capable of defining a necessary accuracy for a motion vector so that the image size of the reduced images for detecting a motion vector is determined in accordance with the necessary accuracy of the photographing information such that the higher the necessary accuracy, the larger the image size becomes. With this structure, the motion vector is appropriately detected in regard to accuracy and speed. With this, an appropriate operation of electronic image stabilization can be actualized.

According to the embodiment, an image appropriately corrected by electronic image stabilization can be obtained.

The present invention is not limited to the specifically disclosed embodiments, and variations and modifications may be made without departing from the scope of the present invention.

The present application is based on Japanese Priority Application No. 2011-061631 filed on Mar. 18, 2011, the entire contents of which are hereby incorporated herein by reference.

What is claimed is:

1. An imaging device including an image sensor, comprising:
    an image obtaining control unit that obtains plural continuous images of an object taken by the image sensor;
    a size determining unit that determines a reduction ratio for reduced images with respect to the images taken by the image sensor based on photographing information of at least one of the images taken by the image sensor, and generates the reduced images by reduction of the images taken by the image sensor and obtained by the image obtaining control unit based on the determined reduction ratio;
    a motion vector detection unit that detects a motion vector of the reduced images; and
    an image synthesis unit that synthesizes the images obtained by the image obtaining control unit based on the motion vector detected by the motion vector detection unit to obtain a synthesized image.

2. The imaging device according to claim 1,
    wherein the size determining unit determines the reduction ratio for the reduced images based on setting information of the imaging device in obtaining at least one of the images, as the photographing information.

3. The imaging device according to claim 1,
    wherein the size determining unit determines the reduction ratio for the reduced images based on characteristic information of at least one of the images, as the photographing information.

4. The imaging device according to claim 2,
    wherein the setting information includes at least one of a zoom position and ISO speed of the imaging device in obtaining at least one of the images, and
    the size determining unit determines the reduction ratio for the reduced images based on the at least one of the zoom position and the ISO speed set in the setting information.

5. The imaging device according to claim 3,
    wherein the characteristic information includes at least one of a contrast of at least one of the images and a predetermined object included in at least one of the images, and
    the size determining unit determines the reduction ratio for the reduced images based on the at least one of the contrast and the predetermined object.

6. The imaging device according to claim 1,
    wherein the photographing information is capable of defining a necessary accuracy for the motion vector, and
    the size determining unit determines the reduction ratio for the reduced images based on the necessary accuracy of the photographing information such that the higher the necessary accuracy, the smaller the reduction ratio becomes.

7. A method of obtaining an image by an image sensor, comprising:
    obtaining plural continuous images of an object taken by the image sensor;
    determining a reduction ratio for reduced images with respect to the images taken by the image sensor based on photographing information of at least one of the images taken by the image sensor;
    generating the reduced images by reduction of the obtained images taken by the image sensor based on the determined reduction ratio;

detecting a motion vector of the reduced images; and
synthesizing the obtained images based on the detected motion vector to obtain a synthesized image.

8. The method of obtaining an image according to claim 7, wherein in the determining the reduction ratio, the reduction ratio for the reduced images is determined based on setting information of the imaging device in obtaining at least one of the images, as the photographing information.

9. The method of obtaining an image according to claim 7, wherein in the determining the reduction ratio, the reduction ratio for the reduced images is determined based on characteristic information of at least one of the images, as the photographing information.

10. The method of obtaining an image according to claim 8, wherein the setting information includes a zoom position or ISO speed of the imaging device in obtaining at least one of the images, and
in the determining the reduction ratio, the reduction ratio for the reduced images is determined based on the zoom position or the ISO speed set in the setting information.

11. The method of obtaining an image according to claim 9, wherein the characteristic information includes a contrast of at least one of the images or a predetermined object included in at least one of the images, and
in the determining the reduction ratio, the reduction ratio for the reduced images is determined based on the contrast or the predetermined object.

12. The method of obtaining an image according to claim 7, wherein the photographing information is capable of defining a necessary accuracy for the motion vector, and
in the determining the reduction ratio, the reduction ratio for reduced images is determined based on the necessary accuracy of the photographing information such that the higher the necessary accuracy, the smaller the reduction ratio becomes.

13. A non-transitory computer-readable recording medium having recorded thereon a program that causes a computer to execute a method of obtaining an image by an image sensor comprising:
obtaining plural continuous images of an object taken by the image sensor;
determining a reduction ratio for reduced images with respect to the images taken by the image sensor based on photographing information of at least one of the images taken by the image sensor;
generating the reduced images by reduction of the obtained images taken by the image sensor based on the determined reduction ratio;
detecting a motion vector of the reduced images; and
synthesizing the obtained images based on the detected motion vector to obtain a synthesized image.

14. The imaging device according to claim 1,
wherein the size determining unit determines the reduction ratio for the reduced images with respect to a number of pixels in the images taken by the image sensor based on photographing information of at least one of the images taken by the image sensor, and generates the reduced images by reduction of the images taken by the image sensor and obtained by the image obtaining control unit based on the determined reduction ratio.

15. The imaging device according to claim 1,
wherein the size determining unit determines the reduction ratio for the reduced images with respect to a resolution of the images taken by the image sensor based on photographing information of at least one of the images taken by the image sensor, and generates the reduced images by reduction of the images taken by the image sensor and obtained by the image obtaining control unit based on the determined reduction ratio.

16. The imaging device according to claim 1,
wherein the size determining unit changes a size of the reduced images based on photographing information of at least one of the images, and generates the reduced images by reduction of the images obtained by the image obtaining control unit based on the changed size.

17. The imaging device according to claim 1,
wherein the reduced images are used for detecting a motion vector.

18. The method of obtaining an image by an image sensor according to claim 7,
wherein in the determining the reduction ratio, the reduction ratio for the reduced images with respect to a number of pixels in the images taken by the image sensor is determined based on photographing information of at least one of the images taken by the image sensor.

19. The non-transitory computer-readable recording medium according to claim 13,
wherein in the determining the reduction ratio, the reduction ratio for the reduced images with respect to a number of pixels in the images taken by the image sensor is determined based on photographing information of at least one of the images taken by the image sensor.

* * * * *